United States Patent [19]

Ishizuka et al.

[11] 4,215,846
[45] Aug. 5, 1980

[54] MULTIPORTION UNITARY VALVE SEAT AND VALVE INCORPORATING IT

[75] Inventors: Mitsumasa Ishizuka, Yokosuka; Makoto Kawai, Hiratsuka, both of Japan

[73] Assignee: Honeywell Inc., Minneapolis, Minn.

[21] Appl. No.: 889,872

[22] Filed: Mar. 23, 1978

[30] Foreign Application Priority Data

Apr. 1, 1977 [JP] Japan .................................. 52/36183

[51] Int. Cl.² .......................... F16K 3/22; F16K 25/00
[52] U.S. Cl. ..................................... 251/298; 251/162; 251/316; 251/334
[58] Field of Search ............... 251/298, 317, 162, 315, 251/177, 334

[56] References Cited

U.S. PATENT DOCUMENTS

| 3,191,619 | 6/1965 | Allen | 137/527.4 |
| 3,623,696 | 11/1971 | Baumann | 251/85 |
| 3,689,026 | 9/1972 | Self | 251/315 |
| 3,946,986 | 3/1976 | Sutter et al. | 251/298 |
| 3,963,211 | 6/1976 | Myers | 251/85 |
| 4,073,473 | 2/1978 | Rihm et al. | 251/298 |
| 4,074,889 | 2/1978 | Engel | 251/298 |

FOREIGN PATENT DOCUMENTS

| 744193 | 1/1944 | Fed. Rep. of Germany | 251/315 |
| 1550226 | 7/1969 | Fed. Rep. of Germany | 251/315 |
| 1282630 | 12/1961 | France. | |
| 49-25024 | 3/1974 | Japan. | |
| 51-105758 | 9/1976 | Japan. | |
| 52-24324 | 2/1977 | Japan. | |

*Primary Examiner*—Arnold Rosenthal
*Attorney, Agent, or Firm*—Laurence J. Marhoefer; Lockwood D. Burton

[57] ABSTRACT

The disclosed valve seat is a unitary member consisting of a rigid annular portion supported from an annular base portion by a resilient, annular, wall-like connecting portion. In the disclosed valve, this base portion is secured in the valve housing to space the noted three portions concentrically along the fluid flow path through the housing. As the cooperating eccentrically-rotated valve plug contacts the seating portion, the plug exerts a force on the seating portion which converges the walls of the connecting portion. This prevents jamming between the plug and the seating portion while permitting a tight fluid seal to be established between those parts. A preferred shape (FIG. 2) for the connecting portion which provides such jam-free but tight fluid sealing action is that of a truncated cone having its larger inner diameter at the base portion of the seat member and its smaller inner diameter at the seating portion of the seat member.

6 Claims, 6 Drawing Figures (PREVIOUSLY KNOWN CONSTRUCTION)

MULTIPORTION UNITARY VALVE SEAT AND VALVE INCORPORATING IT

BACKGROUND OF THE INVENTION

1. FIELD OF THE INVENTION

The present invention relates generally to fluid flow control valves of the type wherein a valve plug and a valve seat are brought into fluid-tight sealing engagement through an eccentric rotary or swinging movement of the plug. Specifically, the invention relates to the construction of the seats of such eccentric rotary valves to the end of facilitating the consistent attainment of the desired movement and fluid-tight sealing engagement between the plug and its cooperating seat.

2. DESCRIPTION OF THE PRIOR ART

Many different forms of seats for rotary valves of the type identified above are known in the art. One of the more popular forms of such seats are the rigid and rigidly mounted seats which are employed in rotary valves of the type having either a flexible actuating arm for the plug or having a flexible connection between the plug and a rigid actuating arm. An example of a rotary valve with such a rigid seat and flexible actuating arm for the plug is found in the Baumann U.S. Pat. No. 3,623,696. An example of a rotary valve having a rigid seat and a plug which is flexibly or shiftably mounted on a rigid arm is found in the Myers U.S. Pat. No. 3,963,211.

Another known form of the type of valves identified above is the form wherein a rigid seat is moveable as a unit within the valve housing to facilitate the obtaining of the desired sealing engagement between the plug and the seat. Examples of this form of seat and valve are found in the Allen U.S. Pat. No. 3,191,619 and in the Sutter et al U.S. Pat. No. 3,946,986.

Still another known form of valves of the above-identified type is that in which the seat has flexible lips against which the plug seals when in its valve-closed position. An example of this type of valve and seat is found in the Vulliez French Patent No. 1,282,630. Another example of a lipped seat in an eccentric rotary valve is found in the Rihm et al U.S. Pat. No. 4,073,473.

Additionally, it has been proposed in Japanese Patent Application No. 105,758/76, filed on Sept. 6, 1976, to provide a unitary seat member for eccentric rotary valves which is characterized by having annular base and rigid annular seating portions connected by a funnel-shaped resilient portion with its smaller internal or inner diameter located at the base portion and its larger inner diameter located at the seating portion. The resilient connecting portion of such a seat construction is intended to permit the seating portion to shift into proper sealing engagement with the moving plug.

Although the forms of valves and valve seats referred to above have doubtless found utility in numerous applications, each of the known constructions as described above possesses a shortcoming which has kept it from being entirely suitable. For example, in the form of valve having a rigid seat and a flexible plug actuating arm, undesirable wear is experienced because the plug must slide over the edge of the cooperating seat as the plug is forced into the closed position. The form of valve having a flexibly mounted plug has the disadvantage of requiring a complex structure to achieve the needed flexibility, and also has the disadvantage of being subject to plug instability and flutter.

The form of rigid seat which is moveable as a unit within the valve housing has presented problems resulting from the need for fluid-tight sealing between the moving seat unit and the valve body, and resulting from the inherently complex construction of such a moveable seat unit. The flexible lip type of seat suffers from such problems as wear, erosion, and/or permanent deformation into a poor sealing condition, and the inability to withstand high fluid velocities. Finally, the form of valve employing the noted unitary seat member with the funnel-shaped connecting portion is subject to sticking or jamming of the plug on the seating portion, thus presenting problems in connection with the moving of the plug off of the seating portion.

SUMMARY OF THE INVENTION

Accordingly, it is an object of the present invention to provide an improved valve seat construction, and an improved valve construction embodying that seat construction, which avoid the above-noted shortcomings and resulting problems which are inherent in the noted known rotary valve and seat constructions. Specifically, it is an object of the invention to provide an improved seat member which does not require any plug actuating arm flexing or plug mounting flexing, which does not move within the valve housing so as to require a complex construction and/or complex sealing within the valve housing, which does not employ any flexible lips or other fragile or permanently deformable portions, and which does not cause jamming of the valve plug.

To the end of accomplishing the above-noted and other desirable objects, the valve seat member according to the present invention is made as a unitary seat member consisting of three portions. The first of these portions is a base portion having a central opening. This portion may be rigid and may be annular in shape, and is arranged to be easily secured within the housing along the flow path of the valve in which the seat member is used. The second portion of the seat member is a rigid annular seating portion to be engaged by the plug of the associated valve. The third portion of the seat member is a resilient annular connecting portion which integrally joins the base and seating portions together into a unitary structure so that the seating portion is supported and spaced from the base portion along the fluid flow path. In accordance with the present invention, the resilient connecting portion is so shaped that the force which the plug exerts on the seating portion, when the plug engages that portion, converges the walls, and hence reduces the inner diameter, of the connecting portion. Such shaping of the connecting portion and the resulting wall convergence provide the desired fluid sealing action while avoiding the jamming problem noted hereinbefore. One desirable shape for the connecting portion which provides such wall convergence and freedom from jamming is a truncated conical shape with the larger inner diameter of the cone at the base portion of the seat member and the smaller inner diameter of the cone at the seating portion of the seat member.

BRIEF DESCRIPTION OF THE DRAWINGS

A better understanding of the present invention may be had from the following detailed description when read in connection with the accompanying drawings, wherein.

DETAILED DESCRIPTION

THE KNOWN SEAT MEMBER OF FIG. 1

Figure 1:
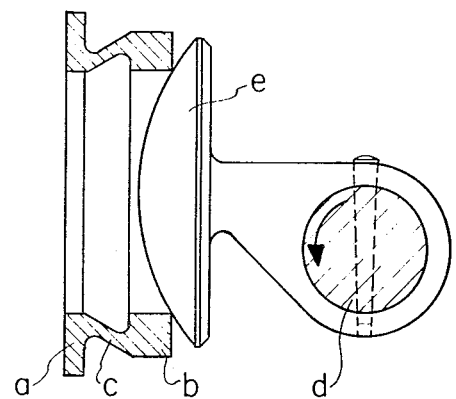
FIG. 1 is a cross-sectional view of a unitary valve seat member acccording to the above-noted Japanese patent application, showing also the cooperating plug.

The seat member shown in FIG. 1, and illustrating the known construction disclosed in the above-noted Japanese patent application, consists of an annular base portion a for mounting the seat member in a valve housing, a rigid annular seating portion b, and a resilient annular connecting portion c. The connecting portion c integrally joins the base portion a and the seating portion b together into a unitary structure, with the seating portion b supported by, spaced from, a coaxial with the base portion a. The connecting portion c is funnel-shaped, with its larger diameter located at the seating portion b, and its smaller inner diameter located at the base portion a.

FIG. 1 also shows the end of the operating shaft d for a rotary valve plug e of the usual spherical form which cooperates with the seating portion b to control the flow of fluid through the seat member. The actuating arm portion of the plug e is fixed to the shaft d, which is radially offset with respect to the axis of the seating portion b. Thus, when the shaft d is rotated in the counter-clockwise direction as shown by the arrow, the plug e is eccentrically rotated with respect to the seating portion b to bring the spherical seating surface of the plug e into force-exerting engagement with the seating portion b. In response to this force exerted by this eccentric movement of the plug e and its seating surface, the seating portion b is displaced into fluid sealing engagement with the seating surface of the plug e. Such displacement of the seating portion b is made possible by the resiliency of the connecting portion c. The dimensions of the seating portion b are such that the above-described action does not distort the seating portion b, thereby permitting the plug seating surface to engage the seating portion b tightly.

As previously noted, however, the seat member construction shown in FIG. 1 causes the plug to jam on the seating portion. The effect of this is that, when the shaft d is rotated in the clockwise or valve-opening direction to separate the seating surface of the plug e from the seating portion b, the plug e must be moved through a greater distance than that which was required for establishing the sealing of the plug seating surface on the seating portion b. This prevents the attainment of accurate control of the valve-opening movement of the plug e. Further, additional rotative force must be applied to the shaft d in order to move the plug e out of its jammed position. Also, particularly in the case of small valves, undesirable impact sometimes occurs as the plug leaves the seating portion. It is these shortcomings of the FIG. 1 seat member construction which have led to the need for the improved seat member construction of FIG. 2.

THE IMPROVED SEAT MEMBER OF FIG. 2

Figure 2:
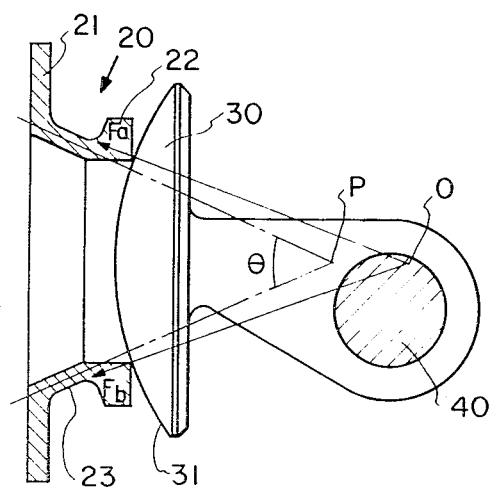
FIG. 2 is a similar view of a unitary valve seat member which represents a preferred embodiment of the above-noted improved valve seat construction according to the present invention.

In order to avoid the above-described shortcomings of the seat member construction illustrated in FIG. 1, as well as the previously described shortcomings of the other known seat member and valve constructions, the improved unitary seat member of FIG. 2 has been provided. That seat member is identified in FIG. 2 by the reference numeral 20, and consists of an annular base portion 21, a rigid annular seating portion 22, and a resilient, annular, wall-like connecting portion 23. The base portion 21 is constructed and shaped so as to facilitate its being mounted and secured within the housing of a valve for the purpose of securing therein the entire seat member 20 along the fluid flow path within the housing.

The connecting portion 23 integrally joins the base portion 21 and the seating portion 22 together into a unitary structure in which the seating portion 22 is supported by the base portion 21 at a distance therefrom and coaxial therewith. Accordingly, the portions 21, 22, and 23 are spaced coaxially along an axis which, in practice, may well coincide with the axis of a valve housing. The connecting portion 23 is of truncated conical shape with its larger inner diameter at the base portion 21 and its smaller inner diameter at the seating portion 22. Thus, the portion 23 amounts to a tapered tube having an inside diameter which gradually increases from the seating portion 22 to the base portion 21.

FIG. 2 also shows a rotary valve plug 30 which cooperates with the seating portion 22 to control the flow of fluid through the seat member 20. The plug 30 is provided with the usual spherical seating surface 31 which has a center of curvature O. When the plug 30 is in its valve-closed position shown in FIG. 2, with the seating surface 31 in fluid sealing engagement with the seating portion 22, the point O lies along the axis of the seat member 20.

The plug 30 also includes an actuating arm portion which is fixed on an operating shaft 40. The shaft 40 is radially offset with respect to the axis of the seat member 20 in the usual manner. Thus, when the shaft 40 is rotated to move the plug 30 into and out of its valve-closed position, the seating surface 31 is moved into and out of force-exerting fluid sealing engagement with the seating portion 22 about an axis which is radially offset with respect to the axis of the seat member 20 and the seating portion 22.

The seating portion 22 derives its rigidity from the relatively large dimensions of the annulus constituting that seating portion. Similarly, the connecting portion 23 derives its resiliency from the relatively small lateral thickness of its walls. This wall thickness must, of course, be sufficient to withstand the fluid pressure to which the portion 23 is subject in use. The dimensions and rigidity of the seating portion 22 are such that the noted engagement between the plug seating surface 31 and the seating portion 22 does not distort the latter.

As shown in FIG. 2, the walls of the cone-shaped connecting portion 23 would, if continued, converge at an apex point P and define an opening angle $\theta$. It is desirable to make the opening angle $\theta$ of such a dimension that the point P lies between the center point O and the seating portion 22 and, therefore, is closer to the seating portion 22 than is the point O.

OPERATION OF THE FIG. 2 CONSTRUCTION

As the shaft 40 is rotated in the counter-clockwise direction to move the plug 30 and its seating surface 31 into the valve-closed position, the seating surface 31 contacts the seating portion 22 and exerts a force on the latter in the direction from the point O. Components of that force which are perpendicular to the seating surface 31 act on the seat member 20 as shown by the arrows Fa and Fb to cause the walls of the portion 23 adjacent to the seating portion 22 to converge, thereby decreasing the inner diameter of the connecting portion 23 adjacent to the seating portion 22.

Stated differently, the noted force which the plug 30 exerts on the seat member 20 distorts or deforms the walls of the connecting portion 23 to cause them to converge adjacent to the seating portion 22. This convergence or inward expansion of the connecting portion walls reduces the inner diameter of the connecting portion or, more specifically, reduces the inner diameter of, or squeezes, the hole or opening or passage in the connecting portion. As a result, the counter-clockwise rotation of the shaft 40 moves the seating surface 31 smoothly relative to the seating portion 22 until the seating surface 31 is in full, tight, fluid sealing engagement with the seating portion 22. Thereafter, when the shaft 40 is rotated in the clockwise direction to move the plug 30 into the valve-open position, the seating surface 31 moves smoothly out of its tight sealing engagement with the seating portion 22, without being subject to the undesirable actions noted above in connection with the previously known seat member construction of FIG. 1.

THE ANALYSES OF FIGS. 3 AND 4

Figure 3:
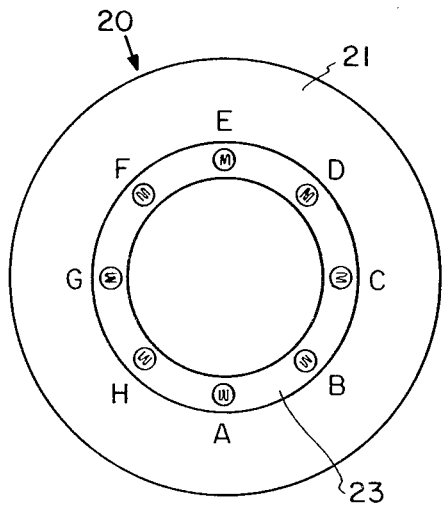
FIG. 3 is a view of the connecting portion of the FIG. 2 seat member, as seen from the left of FIG. 2, showing the locations of strain analyzing strain gauges on said connecting portion.

In order to analyze and determine the basis for the desirable operation obtained with the FIG. 2 seat member construction with reference to the less desirable operation obtained with the FIG. 1 seat member construction, strain analyses were made on the connecting portions of a seat member constructed in accordance with FIG. 2, a seat member constructed in accordance with FIG. 1, and a seat member constructed in accordance with FIG. 2 but modified so that the apex point P was further from the seating portion than was the plug seating surface curvature center O. For each of the analyses, strain gauges were secured in spaced relation on and around the interior circumference of the corresponding connecting portion. The positioning of the strain gauges as applied to the connecting portion 23 of the FIG. 2 seat member is shown in FIG. 3. This strain gauge positioning was used also for the connecting portions of the other two seat member constructions noted above. As shown in FIG. 3, eight strain gauges A, B, . . ., G, and H were placed on the inside surface of the wall of the portion 23 at points which were equally spaced apart from one another around the wall circumference.

For each analyzed connecting portion, the strains sensed by the eight strain gauges were plotted for each of eight different values of sealing force exerted on the corresponding seat member by the corresponding plug. Those eight values of sealing force corresponded to eight positions or rotational angles of the corresponding shaft and plug as the latter were moved out of the valve-closed position. The plotted strains and strain variations around the interior circumferences of the three analyzed connecting portions are shown in FIG. 4, wherein the group of curves a pertains to the seat member construction according to FIG. 2, the group of curves b pertains to the seat member construction according to FIG. 1, and the group of curves c pertains to the noted modified seat member construction according to FIG. 2.

Figure 4:
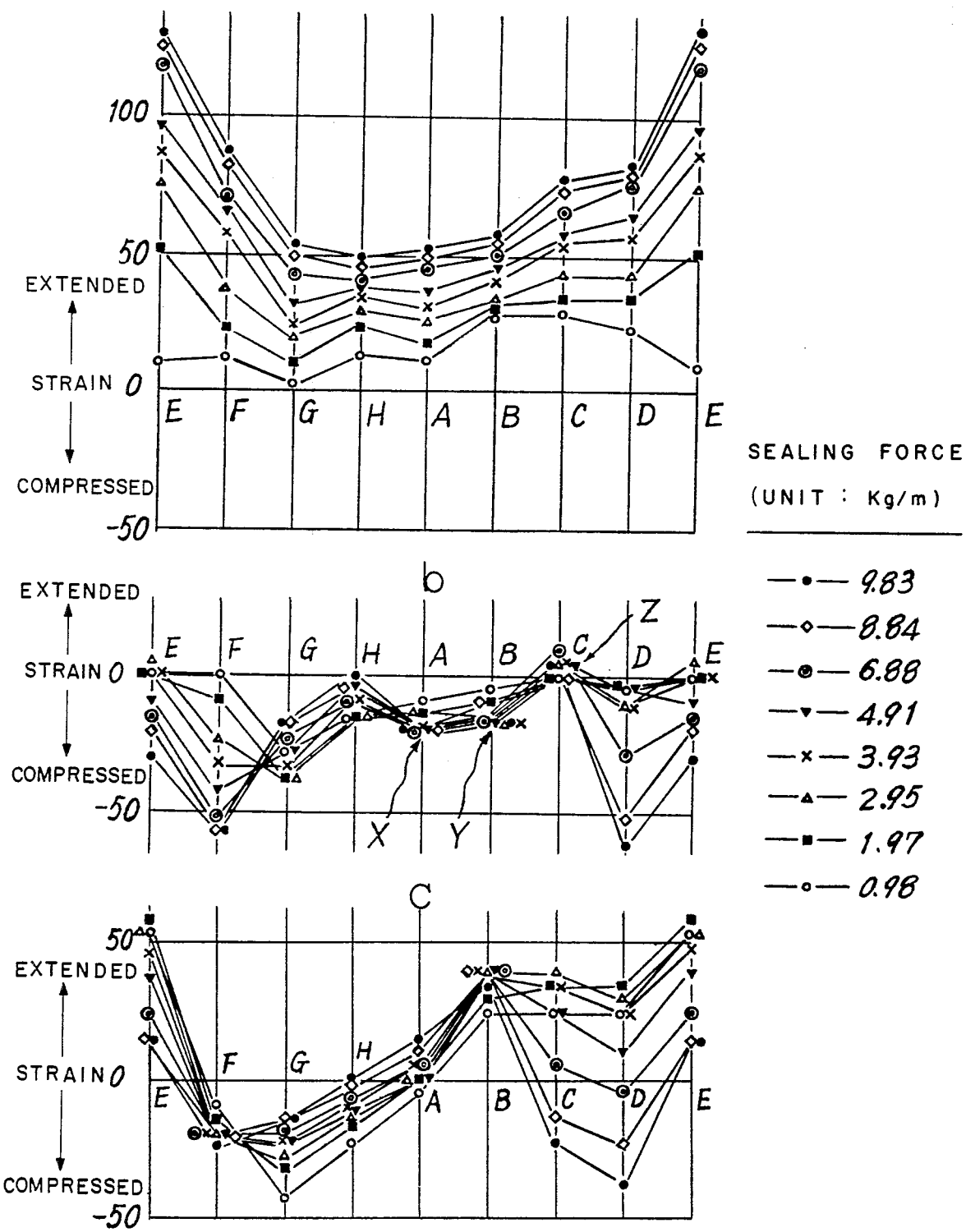
FIG. 4 is a series of graphs illustrating the results of strain analyses made on the connecting portions of three different forms of seat members using the gauge locations of FIG. 3.

The curves of FIG. 4 show the strain conditions within the three noted connecting portions which explain why the operation of the FIG. 2 form of seat member (curves a) is greatly superior to the operation of either the FIG. 1 form of seat member (curves b) or the modified FIG. 2 seat member construction (curves c). Thus, it can be seen from the curves a that the strain in the connecting portion 23 diminishes at approximately the same rate as the sealing force diminishes as the plug 30 is rotated to move the plug out of the valve-closed position. This is the basis for the smooth opening movement of the plug 30 and the absence of any jamming. The curves b show, on the other hand, that the strain at several locations in the FIG. 1 form of connecting portion remain substantially unchanged as the sealing force diminishes. The strains shown by the curve portions X, Y, and Z are examples of such unchanging strains. It is this action which explains the jamming exhibited by the FIG. 1 seat member construction. Additionally, the crossing of the b curves indicates a complex strain pattern, wherein some strains actually increase as the sealing force is decreased. The curves c show that the modified form of seat member exhibits a tendency to act in a manner which is similar to that in which the FIG. 1 seat member construction acts, but to a different extent.

A comparison of the three groups of curves of FIG. 4 leads to the following conclusions. When the connecting portion is shaped according to FIG. 1, where the plug force tends to expand rather than converge the connecting portion, the group b curves show a complex strain pattern which explains the above-noted jamming action which characterizes the operation of the FIG. 1 form of seat member construction. However, when the connecting portion is constructed and shaped as is shown in FIG. 2, to cause the plug force to converge the connecting portion wall and hence to squeeze the path within that wall, the group a curves show that such a connecting portion shape yields a normal strain pattern which coincides with freedom from any tendency of the plug to jam. Finally, when the connecting portion is shaped generally as shown in FIG. 2 but with the apex point P further from the seating portion than is the plug curvature center O, the group c curves show a strain pattern which is not as complex as that for the FIG. 1 form of seat member, but which is less desirable than that produced by the FIG. 2 form of seat member.

A further feature of the FIG. 2 seat member construction is that no consideration needs to be given as to what part of the plug seating surface 31 first contacts or last leaves the seating portion 22, or as to the manner in which such contact takes place. What is important is that the connecting portion 23 be shaped so that the force exerted by the plug 30 on the seat member 20 converges the walls of the connecting portion 23.

THE IMPROVED VALVE OF FIG. 5

Figure 5:
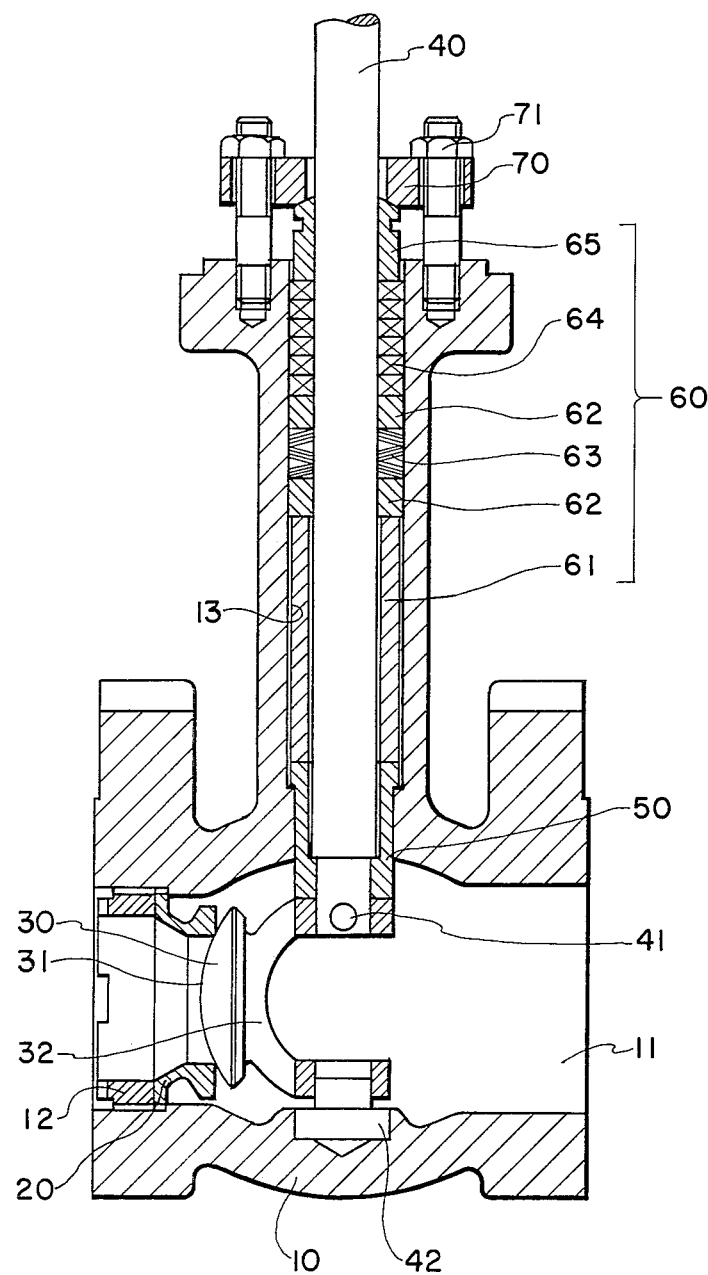
FIG. 5 is a cross-sectional view of a rotary valve utilizing the seat member of FIG. 2.

As noted hereinbefore, FIG. 5 shows a rotary valve wherein the seat member is the improved seat member 20 of FIG. 2. Except for including the FIG. 2 form of seat member, the FIG. 5 valve is of conventional form. Thus, the FIG. 5 valve includes a valve casing or housing 10 containing a fluid flow path 11. A retainer 12 secures the base portion of the seat member 20 against a shoulder within the housing 10 to secure the seat member 20 within the housing 10. As shown, the seat member 20 is so positioned within the housing 10 that the axis of the seat member 20 lies along the flow path 11, and so that the base portion of the seat member 20 is adjacent to, and concentric with, one of the openings in the housing 10.

The FIG. 5 valve also includes the plug 30 with its spherical seating surface 31, which cooperates with the seating portion of the seat member 20 in the same manner as explained in connection with FIG. 2. In FIG. 5, the actuating arm portion of the plug 30 is shown at 32, and is shown as having one of its arms secured on the shaft 40 by means of a pin 41. The other of the arms of the portion 32 is shown as being rotatable on a stud 42 which is fastened in the wall of the housing 10.

In the FIG. 5 valve, the shaft 40 is rotatable within a passage 13 of the housing 10. The inner end of the shaft 40 is supported within a guide ring 50 which extends from the inner end of the passage 13. The remainder of the shaft 40 is supported within the passages 13 by sealing members 60, which include a collar 61, packing 62, a group of spring washers 63, additional packing 62 and 64, and a packing follower 65. These members lie along the shaft 40, in the order stated, between the inner and outer ends of the shaft 40. The sealing members 60 are secured in place by a packing flange 70 and nuts 71 to prevent fluid leakage along the shaft 40. The operation of the FIG. 5 valve to control the flow of a fluid along the flow path 11 is the same as the operation described hereinbefore in connection with the plug and seat member of FIG. 2.

THE IMPROVED SEAT MEMBER OF FIG. 6

Figure 6:
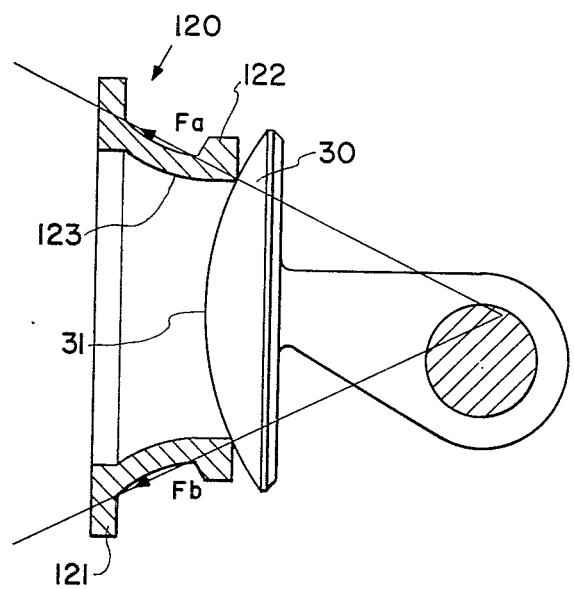
FIG. 6 is a view, similar to that of FIG. 2, showing a different additional form of unitary valve seat member constructed according to the present invention.

The improved seat member of FIG. 6 is identified therein by the reference numeral 120, and represents a modification of the seat member 20 of FIG. 2. The seat member 120 consists of an annular base portion 121, a rigid annular seating portion 122, and a resilient annular connecting portion 123. The base portion 121 and the seating portion 122 are essentially the same as the corresponding portions of the FIG. 2 seat member.

The shape of the connecting portion 123 is different from that of the connecting portion 23. Specifically, the connecting portion 123 has a curved shape such that the force components Fa and Fb, exerted by the plug 30 and perpendicular to the spherical seating surface 31, distort the wall of the portion 123 so as to make the wall curvature have a smaller radius. Thus, the force exerted by the plug 30 causes the walls of the portion 123 to converge and thus prevent jamming of the plug and seating portion as for the construction shown in FIG. 2.

It is believed to be clear from the foregoing description that the described unitary seat member constructions according to the present invention fulfill the objects stated herein. Thus, it has been shown that such seat member constructions facilitate the obtaining of a consistently good fluid-tight seal between the seat member and its associated plug without producing jamming between those parts, without requiring the flexing of the plug-supporting means, the shifting of the entire seat member, the flexing of the plug on its supporting means, or the use of flexible lips or other portions which are readily degraded and/or displaced.

The embodiments of the invention in which an exclusive property or privilege is claimed are defined as follows:

1. In an eccentric rotary fluid flow control valve including
    a housing containing a fluid flow path,
    a unitary seat member having an annular base portion secured in said housing along said flow path and having a rigid annular seating portion spaced from said base portion and having an axis lying along said flow path,
    a plug having a seating surface having a center of curvature, and
    means for supporting said plug for rotation of said seating surface into and out of force exerting fluid sealing engagement with said seating portion about an axis which is radially offset with respect to said axis of said seating portion, the improvement comprising
    a resilient annular connecting wall portion for said seat member integrally joining said base portion and said seating portion together into a unitary structure and supporting said seating portion from said base portion, said wall portion being of truncated conical shape and having an inner diameter which decreases gradually and continuously from said base portion to said seating portion, with the largest value of said inner diameter being equal to the inner diameter of said base portion, with the smallest value of said inner diameter of said wall portion being equal to the inner diameter of said seating portion, andd with the apex point of the cone formed by line extensions of said wall portion lying within a cone formed by lines connecting said center of curvature of said seating surface to the points of engagement between said seating surface and said seating portion which result when said seating surface has been moved into said sealing engagement with said seating portion,
    whereby force exerted on said seating portion by said plug seating surface deforms said wall portion in the direction to converge the walls, and hence reduce said inner diameter, of said wall portion.

2. An improved valve as specified in claim 1, wherein said seating portion derives its rigidity from the relatively large dimensions of the annulus constituting said seating portion, and
    said connecting portion derives its resiliency from the relatively small lateral thickness of its wall.

3. A unitary seat member for use in cooperation with an eccentrically rotated value plug having a seating surface with a center of curvature, said seat member comprising
    an annular base portion adapted to be secured within an eccentric rotary valve relative to the plug thereof,
    a rigid annular seating portion, and
    a resilient annular connecting wall portion integrally joning said base portion and said seating portion together into a unitary structure and supporting said seating portion from said base portion for engagement by the cooperating plug, said wall portion being of truncated conical shape and having an inner diameter which decreases gradually and continuously from said base portion to said seating portion, with the largest value of said inner diameter being equal to the inner diameter of said base portion, with the smallest value of said inner diameter of said wall portion being equal to the inner diameter of said seating portion, and with the apex point of the cone formed by line extensions of said wall portion lying closer to said seating portion than does said center of curvature of said seating surface, whereby force exerted on said seating portion by the cooperating plug when the latter engages said seating portion deforms said wall portion in the direction to converge the walls, and hence reduce said inner diameter, of said wall portion.

4. A valve seat member as specified in claim 3, wherein said seating portion derives its rigidity from the relatively large dimensions of the annulus constituting said seating portion, and said connecting portion derives its resiliency from the relatively small lateral thickness of its wall.

5. A unitary seat member for use in cooperation with an eccentrically rotated valve plug provided with a spherical seating surface having a radius of curvature, said seat member comprising an annular base portion adapted to be secured within an eccentric rotary valve relative to said cooperating plug, a rigid annular seating portion, and a resilient annular connecting wall portion integrally joining said base portion and said seating portion together into a unitary structure and supporting said seating portion from said base portion for engagement by said seating surface of said cooperating plug, said wall portion being in the form of a truncated cone having an inner diameter which decreases gradually and continuously from said base portion to said seating portion, with the largest value of said inner diameter being equal to the inner diameter of said base portion, with the smallest value of said inner diameter of said wall portion being equal to the inner diameter of said seating portion, and with the apex point of the cone formed by line extensions of said wall portion lying within a cone formed by lines connecting said center of curvature of said seating surface to the points of engagement between said seating surface and said seating portion which result when said seating surface engages said seating portion, whereby force exerted on said seating portion by said seating surface of said cooperating plug when said surface engages said seating portion deforms said wall portion in the direction to converge the walls, and hence reduce said inner diameter, of said wall portion.

6. A seat member as set forth in claim 5 wherein said seating portion derives its rigidity from the relatively large dimensions of the annulus constituting said seating portion and said connecting portion derives its resiliency from the relatively small lateral thickness of its wall.

* * * * *